INVENTORS
LEWIS BALAMUTH
CLIFFORD A. ROBERTSON
BY
Leonard W. Suroff
ATTORNEY

INVENTORS
LEWIS BALAMUTH
CLIFFORD A. ROBERTSON
BY
*Leonard W. Suroff*
ATTORNEY

INVENTORS
LEWIS BALAMUTH
CLIFFORD A. ROBERTSON
BY
Leonard W. Suroff
ATTORNEY

000# United States Patent Office 3,445,307
Patented May 20, 1969

3,445,307
METHOD AND APPARATUS EMPLOYING VIBRATORY ENERGY FOR JOINING MATERIALS
Lewis Balamuth, New York, and Clifford A. Robertson, Bayshore, N.Y., assignors to Cavitron Corporation, Long Island City, N.Y., a corporation of New York
Filed Aug. 3, 1965, Ser. No. 476,975
Int. Cl. B32b 31/08; B30b 13/00
U.S. Cl. 156—73        27 Claims

ABSTRACT OF THE DISCLOSURE

Two or more materials, which are to be joined in an overlapping area, are passed through a sealing station consisting of a pair of opposed members having confronting working faces for engagement with the outer surfaces of the overlapped materials. As the materials are caused to pass through the spacing defined by said members, vibratory forces having one component in the low sonic frequency range and another component in the ultrasonic frequency range are applied. The low frequency component couples the ultrasonic frequency component to the materials during a portion of the low frequency cycle to effect a joining of the materials. Depending upon the sequencing of the low frequency component with respect to the movement of the sheets, the joining may be continuous or stitch-like.

---

This invention relates to the joinder of similar or dissimilar materials, and more particularly to methods and apparatus for permanently joining thermosoftening materials with low sonic and ultrasonic vibratory energy.

Most existing ultrasonic joining or sealing devices generally comprise a generator producing an alternating current with a frequency that is in the ultrasonic range, a transducer, which converts the high frequency electrical output of the generator into a high frequency mechanical vibration or compressional wave, a tool secured to the transducer for vibration therewith and a hard surface or anvil against which the tool acts with the materials therebetween. In the joining or sealing together of thermoplastic sheet materials through the use of devices of the type described above, the tool is vibrated perpendicular to the planes of the two films or sheets being joined, that is, in the direction of the longitudinal axis of the transducer. These forces result in the repeated compressing of the thermoplastic material at the indicated ultrasonic or high frequency to thereby generate heat internally within the thermoplastic materials so that fusion therebetween results without affecting substantial areas of the sheet material adjacent to the joint.

For continuous sealing of extended lengths of material it has been further proposed to employ a tool having a working face which is vibrated, as described above, and disposed at a fixed location past which the sheets of thermoplastic material are conveyed, so that a continuous joint or seam is formed parallel to the direction of movement of the sheet materials. The gap or spacing between the tool and anvil as defined by the working face of each is very critical and any changes therein will generally affect the quality or consistency of the resultant seals obtained.

A clamping of the overlapped materials is required to properly transmit the ultrasonic vibratory energy to the sheets and this is generally accomplished by maintaining the distance between the opposing surfaces or working faces of the members, relatively fixed to define a spacing therebetween. This spacing is less than the normal thicknesses of the combined sheets of material so as to continuously maintain the sheets under compression and properly transmit the ultrasonic vibratory energy thereto.

The above described existing devices for ultrasonic joining of materials have several disadvantages. In maintaining this static clamping pressure there is continuous frictional engagement between the outer surfaces of the sheets and opposing surfaces of the ultrasonically vibrated tool and anvil. This continuous frictional engagement induces a heating of the vibratory member or tool with resultant changes in its vibratory characteristics and physical length. In the continuous joining of the thermoplastic sheets of material, which may be in the thickness range of .0005 to .020 inches, these variations become critical and if not properly accounted for inconsistent seals occur. Thus, in the ultrasonic sealing devices in which the materials are maintained under continuous pressural contact and moved relative to the vibratory member, it has been found that, when sealing substantial lengths in this manner, there is a tendency for the vibratory member to increase in temperature to an extent sufficient to affect the frequency of vibration as well as amplitude of vibration, and at the same time to alter the quality of the seal produced.

Further, when continuous seals are made the vibratory tool cannot dissipate the heat at a sufficient rate and soon overheats causing changes in the consistency of the seals. This heat build-up cannot be tolerated in view of the critical thicknesses of the materials being joined. It will be apparent that this situation may not occur until several feet or yards have been sealed. At this time the heat build-up in the vibratory tool is not dissipated at a rate equal sufficiently to the introduction of heat into the tool working face and in short order improper seals are obtained.

Another disadvantage of the above described ultrasonic sealing equipment in which a vibratory tool tip is employed for seam joining is that there is a tendency of the vibratory tip to plow into the plastic film as it heats due to the continuous frictional engagement under pressure. The plastic sheets are initially overlapped a given distance and this distance should be consistent throughout the extended length of overlap, but due to the plowing action of the vibratory tip not only with the seal overlap vary, but unsatisfactory seals are obtained.

The primary object of the invention is to provide novel methods and apparatus for the continuous joining of materials.

A further object of the invention is to provide novel methods and apparatus for the continuous joining of materials with vibratory energy.

Another object of the invention is to provide novel methods and apparatus for the joinder of materials utilizing low sonic and ultrasonic vibratory energy.

Yet another object of the invention is to provide novel methods and apparatus for effecting intermittent joinder of relatively thin sheet materials by the application of low sonic and ultrasonic vibratory energy.

An additional object of this invention is to provide novel methods and apparatus to permanently join materials by the simultaneous application of combined low sonic and ultrasonic vibratory forces.

The inventors have found that the shortcomings of the prior art devices may be avoided by the employment of an ultrasonically vibrated member and an anvil mounted in longitudinal alignment therewith and wherein the anvil is vibrated as the material passes between the said anvil and ultrasonic tool. By vibrating the anvil during the joining process we eliminate the heating of the ultrasonically vibrated tool since there are only intermittent contacts between the anvil and the thermoplastic materials. These intermittent contacts aid us in that the frictional resistance to the movement of the sheets being joined is considerably minimized and there is a lesser tendency for the ultrasonically vibrated tool to over-heat. In addition, we eliminate the plowing or tearing normally encountered in the prior art devices. The frequency of the vibratory anvil, its width, and speed of the moving sheets may be synchronized to obtain a variety of seals, in which a small overlap exists between each successive seal to obtain a continuous seal or a gap of spacing between each of the seals.

When the anvil is vibrated it essentially acts as a pressure member to compress the sheets and permit a proper coupling of the ultrasonic energy to the materials only during a portion of the cycle of vibration of the anvil. The anvil is preferably vibrated in the low sonic frequency range, which is intended to include vibrations from 0 to 1000 cycles per second, so that a simple sewing machine action may be obtained. Vibratory forces in the ultrasonic frequency range are simultaneously applied to the materials, and which is intended to include for purposes of this invention vibrations in the range of approximately 10,000 to 100,000 cycles per second.

By combining vibratory forces in the above two freqency ranges we obtain not only intermittent contact with the materials traveling through the joining station or sealing zone, but also as a consequence of this there is a variable gap and a variable static force component present. Therefore, one has only to be sure that the gap and force needed for best joining conditions are included in the variable gap and variable force used. In this way, precision is maintained and the guarantee of a good seal is every time assured.

Only during that portion of the low frequency cycle when the low sonic vibratory force is brought to bear against the materials will the static pressure necessary to couple the ultrasonic energy to the materials be transmitted thereto. Depending upon the thicknesses, acoustical properties of the materials, etc. the materials may be continuously fed between a pair of opposing members on a continuous or intermittent basis with respect to each other. If the materials are moved intermittently then they are substantially at rest when the low sonic forces couple the ultrasonic forces to the materials. In either arrangement, continuous or intermittent, the sliding frictional engagement between the ultrasonic vibratory member and the materials under a static force is maintained at a minimum at all times, this in turn causes a minimum of heating without bringing about the plowing action and fluctuations in frequency and tool length encountered with the prior art devices.

In accordance with the present invention, the materials are overlapped in the area where they are to be joined and are passed through a sealing station consisting of a pair of opposed members having confronting working faces for engagement with the outer surfaces of the overlapped materials. As the materials are caused to pass through the spacing defined by said members, opposing vibratory forces including a component in the low sonic and ultrasonic range are simultaneously applied to the materials in their area of overlap. The high frequency vibratory energy is applied by vibrating one of said members in the ultrasonic frequency range and maintaining its working face in substantial engagement with an outer surface of the overlapped materials, while the other member is simultaneously vibrated in the low sonic frequency range to engage its working face with the opposite surface of the overlapped materials.

By adjusting the relative magnitude of the low frequency vibratory member the pressure applied to the overlapped sheets may be controlled. This force applying member will press together the overlapped materials to cause transmission or coupling of the ultrasonic vibrations to the interface of the overlapped surfaces with a resulting joining therebetween. The rate of advancement of the materials relative to the vibratory members, in addition to the frequency of vibration of the low frequency vibratory members may be regulated to form a continuous or a series of spaced joinings between the overlapped surfaces.

In accordance with another aspect of the invention, the materials to be joined together are fed between opposing members, having at least in part, confronting working faces for engagement with opposite sides of the overlapped materials. Depending upon the material thicknesses and composition, the vibratory forces applied by these members which include a component in the ultrasonic frequency range, and a component in the low sonic frequency range, are applied along a common line either on opposite sides of the materials, the same or combinations thereof.

Thus, in accordance with one embodiment of the invention a static force is applied to the overlapped surfaces at one side thereof by one of the opposing members and vibratory forces in the low sonic and ultrasonic frequency range are applied simultaneously thereto at the opposite side by vibrating the opposing member in both frequency ranges simultaneously. Concurrently, with this force applying operation the materials are moved relative to the members on an intermittent basis so as to progressively join the materials along their area of overlap. Preferably the intermittent movement is synchronized with the low sonic frequency forces such that no relative motion occurs when the low sonic forces couple the ultrasonic forces to the materials.

In other embodiments employing opposed vibratory members, the vibratory forces having components in the low sonic and ultrasonic frequency range are applied simultaneously to both sides of the overlapped sheets along a common line as the materials are moved relative to the vibratory members so as to progressively join the materials along their area of overlap by the combined low sonic and ultrasonic forces. In another embodiment of the invention employing opposed vibratory members, the vibratory forces are applied having a component in the ultrasonic range only at one side of the materials and components in the low sonic and ultrasonic range applied to the opposite side of the materials.

For a better understanding of the present invention reference should be had to the accompanying drawings, wherein like numerals of referenec indicate similar parts throughout the several views and wherein.

Figures 1, 3:
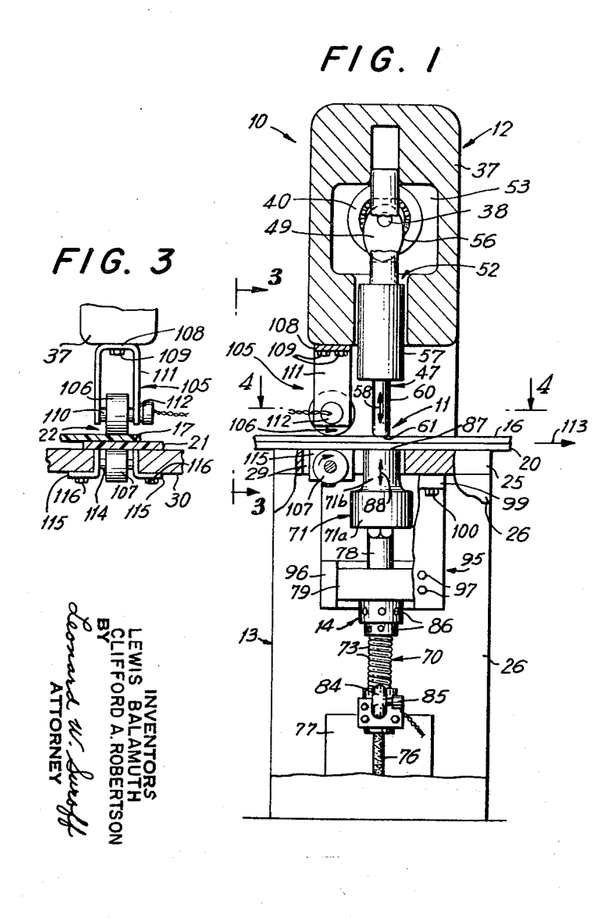
FIG. 1 is a side elevational view, partly broken away and in section of the joining apparatus embodying the present invention.
FIG. 3 is a fragmentary view, partly broken away and in section taken along the line 3—3 of FIG. 1.
Figure 2:
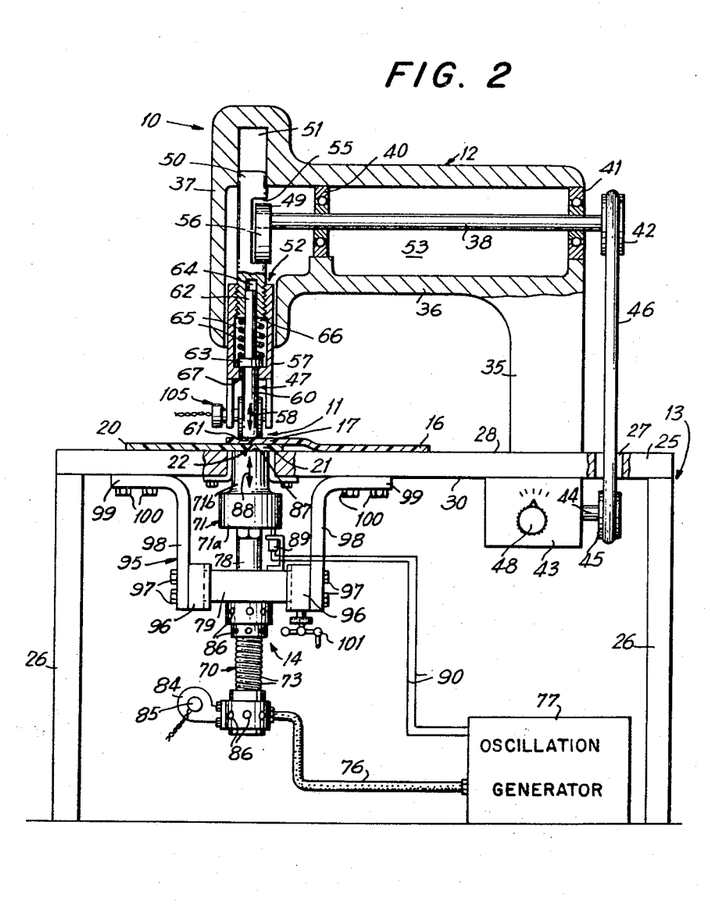
FIG. 2 is a front elevational view, partly broken away and in section, of the joining apparatus of FIG. 1.

Referring now to FIGS. 1, 2 and 3, there is illustrated therein apparatus according to the invention for joining or sealing sheet materials. As indicated by the cross hatching in the figures, the materials illustrated are of plastic, but it will be realized that the sheets to be joined may be of any thermoplastic materials or materials capable of coalescing to form a bond therebetween. It will also be understood, that only one of the materials need be of this character, the other sheet, for example, being of a thermosoftening material into which the fusable material will penetrate. However, for the purpose of the explanation of the figures to follow, it will be assumed that the apparatus is working with plastic sheet materials.

The basic structure for joining sheet material, generally identified by the reference numeral 10, comprises a reciprocating mechanism 12, such as the one found in conventional sewing machines, mounted on a supporting structure 13 and an ultrasonic vibrator 14 mounted in substantial longitudinal alignment with a portion of said reciprocating mechanism 12, by means of bracket assembly 95 to the structure 13, to form a joining or sealing station 11 which receives overlapped sheets of materials 16 and 20 to pass therebetween and joined by the combined action of the vibratory forces applied therethrough. The sheets 16 and 20 are passed between the reciprocating mechanism 12 and vibrator 14 as by feeding means 105 mounted on the supporting structure 13 to control the rate of advancement of the overlapped sheets with respect to the joining station 11.

The supporting structure 13 consists of a work top 25 extending horizontally and supported at each end by a vertically disposed end leg 26. The reciprocating mechanism 12 is rigidly mounted on the work top 25 in any conventional manner. The layers of thermoplastic material 16 and 20 having overlapping portions 17 and 21 respectively, which comprise an area of overlap 22, along which the sheets are joined as they are supported on work surface 28 of the work top 25 and fed past the joining station 11. Aperture 29 is provided in the top 25 to permit a portion of the ultrasonic vibrator 14 and feeding means 105 to extend therethrough and engage the overlapped sheets at one side thereof.

The sheets 16 and 20 are progressively moved between the opposing members as vibratory forces are simultaneously applied along a common line which extends through the reciprocating mechanism 12 and the ultrasonic vibrator 14. The frequency with which the low sonic forces are applied may vary from approximately 0 to 1000 cycles per second, but it has been found that for numerous applications frequencies in the order of 60 and 120 cycles per second produce continuous joining of extended lengths of materials without the overheating of the ultrasonic vibratory member which results in the variation of the seals, as well as the plowing action of the prior art devices. The ultrasonic vibrator 14 is substantially in continuous engagement with the thermoplastic sheets since its amplitude of vibration is generally in the range of .0001 to .005 of an inch as compared to the amplitude of the reciprocating mechanism 12 which may be in the order of .032 to .250 of an inch so that a true physical separation occurs between the sheets and low sonic force applying vibrator. It is generally during this separation of the pressure applying member of the reciprocating mechanism 12 and the sheets that the latter will be advanced for repetitive joining in similar fashion as that of a sewing machine.

The low sonic vibratory forces engage the overlapped surfaces during a portion of the low frequency cycle to compress the materials sufficiently to permit the coupling of the high frequency vibratory energy thereto, and said forces may be applied by a variety of force applying means, for example, a jet of compressed air, a pulsating expandable bellows or a conventional sewing machine mechanism which is readily adaptable to various speeds of oscillation.

The reciprocating mechanism 12 is capable of applying the requisite static forces to the overlapped surfaces to sufficiently compress them together to permit the proper coupling between the overlapped portions 17 and 21 with the ultrasonic vibrator 14. The reciprocating mechanism comprises a vertical portion 35 and an overhanging arm 36 terminating in a head portion 37 in a region above the joining zone 11. Within the chamber 53 of the overhanging arm 36 there is journaled a rotary shaft 38, as shown in FIG. 2, the shaft is journaled adjacent to its left end in a ball bearing 40 and it is journaled adjacent to its right end in a ball bearing 41. The right end of the shaft 38 extends outwardly from the frame of the machine and has secured thereto a pulley 42 through which the shaft is rotated. A variable speed motor 43, connected to a source of electric current (not shown), is mounted on the underside 30 of the horizontal top 25 and has a shaft 44 extending therefrom and a pulley 45 mounted thereon. A belt 46 is mounted between pulleys 42 and 45 respectively, and extends through a cutout 27 in the work top 25. The speed of rotation of shaft 38 and in turn the rate of reciprocation of the vibratory pressure member 47 may be varied by manipulation of the knob 48 which controls the speed of motor 43.

The shaft 38 has a cam 49 secured thereto on its left end and cooperating with said cam is a vertically disposed reciprocatory rod 50 having a slot 55 for receiving the cam and to coact therewith as the latter is rotated. The rod 50 is partially carried within a vertical bore 51 provided in the head 37 and the pressure member 47 is mounted to be yieldably urged to move axially relative to the rod 50 and is also adjustable in small increments to accommodate materials of varying thicknesses. The cam 49 has a peripheral caming surface 56 which is contoured to deliver a longitudinal travel component to the contacting portion of the slot 55 of the rod 50. Predetermined longitudinal movement of the rod 50 in the direction of arrow 58, is obtained by selecting the proper cam and fine adjustments are made by rotating the internally threaded supporting block 57 which is freely rotatable on the rod and is mounted vertically within chamber 52.

The pressure member 47 consists of a forward portion 60 (FIG. 2) which may be of a circular or other cross-sectional shape, having a working face 61 for contact with the overlapped sheets, and a rearwardly extending circular portion 62 with a radial flange 63 integrally connecting said portions. The rear portion 62 rides in a vertically extending counterbore 64 which is formed in the lower portion of the rod 50, and is thereby axially supported.

The pressure member 47 is maintained in resilient riding contact by means of a coiled compression spring 65 pocketed within the longitudinal bore 66 of the adjustable supporting block 57 and extending around the rear portion 62 of the pressure member 47, abutting at one end the radial flange 63 of the pressure member 47 and at its opposite end against the forward lower end of rod 50. The compression spring 65 is maintained under compression between supporting block 57 and the rod 50 and serves the purpose of maintaining the desired contacting pressure between the working face 61 of the pressure member 47 and the overlapped surfaces of the sheets 16 and 20. Accordingly, a coiled compression spring 65 of predetermined compression characteristics is selected for this purpose. To adjust the compressive force desired the block 57 is internally threaded at one end thereof to engage the externally threaded portion of rod 50 and the position of the block 57 will be adjusted a predetermined distance by its rotation.

By this arrangement the spring urged movement of the low sonic vibratory mechanism relative to the head portion 37 is limited by means of the rim 67 on the lower end of the supporting block 57 which limits the travel of the pressure member 47 when urged to the position wherein its radial flange 63 abuts the rim 67. The cam 49 may be selected with a variety of caming surfaces 56 to impart longitudinal motion to the rod 50 which is then transmitted through spring 65 to the pressure member 47. By spring mounting the pressure member 47, the compressive forces applied to the overlapped portions 17 and 21 of sheets 16 and 20 may be more closely controlled and varied when required without the need for changing the cam.

Mounted in opposed relationship to the reciprocating mechanism 12 by means of bracket assembly 95 is the ultrasonic vibrator 14 which may be of any well known type capable of inducing a vibratory mechanical movement in response to the application thereto of an alternating electrical current. For the purposes of the present invention, such vibrations preferably have a frequency in the range between approximately 10,000 cycles per second and 100,000 cycles per second, and have an amplitude, for example, in the range between approximately .0001 and .005 inch and in a plane substantially normal to the overlapping surfaces 17 and 21 of the thermoplastic sheets.

Figure 11:
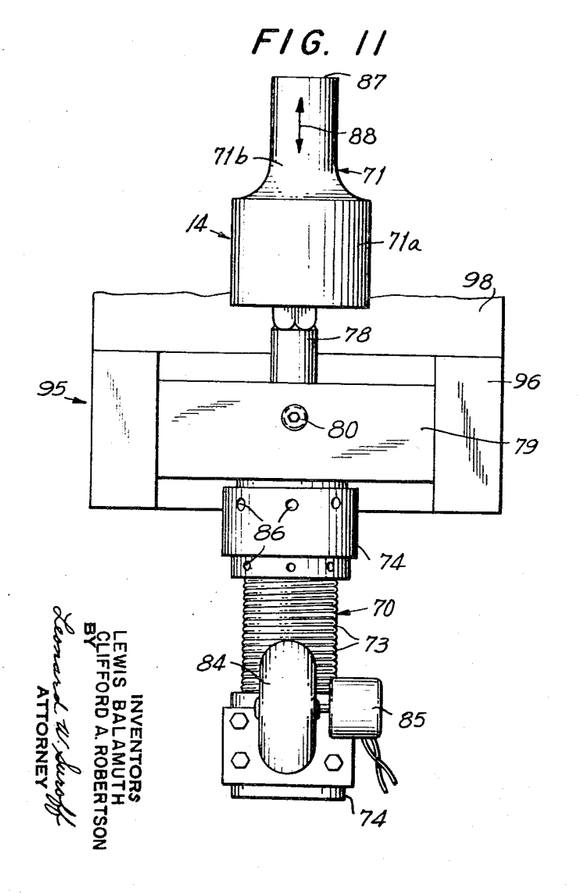
FIG. 11 is an enlarged front view of the ultrasonic vibrator illustrated in FIG. 1.
Figure 12:
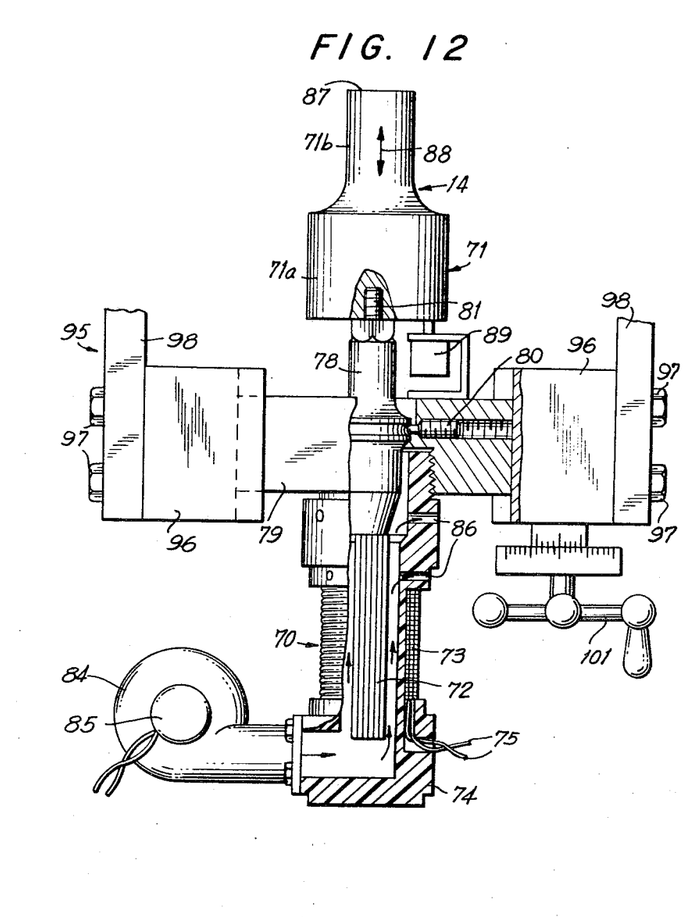
FIG. 12 is a front elevational view, partly broken away and in section, of the ultrasonic vibrator of FIG. 11.

The details of the ultrasonic vibrator 14 are illustrated in FIGS. 11 and 12. The vibrator is comprised of a transducer portion indicated generally at 70, which drives the vibratory member 71 at an ultrasonic frequency. Preferably the transducer 70 includes a stack of plates 72 of magnetostrictive material, around which is wound a magent-coil 73, in well known fashion. The coil 73 is supported on a nonmagnetic sleeve 74 and connected via leads 75 passing through conduit 76 (FIG. 2) to a source of alternating electrical energy of suitable frequency from oscillation generator 77.

One end of the magnetostrictive stack 72 is rigidly fastened to an elongated connecting body 78, which is rigidly mounted in a support block 79, the connecting body 78 is provided with a peripheral depression at its midpoint which retains a series of set screws 80 threadably engageable with the support block 79, to secure the connecting body in place without damping out the longitudinal vibrations therein. By loosening the set screws 80 the combined stack 72 and connecting body 78 may be removed from the structure. The non-conductive sleeve 74 is threadably received in the support block 79.

When transducer 70 is operated by electrical oscillations supplied from generator 77, compressional waves are generated in the stack of laminations 72 and the stack expands and contracts in length at a rate equal to the frequency of the alternating current. The resultant mechanical motion is coupled to the connecting body 78 which is provided at its other end with a threaded portion 81 for engaging the vibratory member 71. The connecting body 78 is made equal in length to a half wave length at the frequency of vibration in the material of which it is formed. Consequently, its midpoint, and thus the mounting screws 80 are at a node of motion and may be rigidly fixed in the support block 79 without affecting its amplitude of vibration.

A blower 84, operated by a suitable motor 85, is fastened at one side at the rear portion of the sleeve 74, providing a stream of air over the stack 72 to dissipate the heat generated therein during its operation. Suitable ports 86 are provided in the sleeve 72 to permit circulation of the air for adequate cooling effect.

The vibratory member 71 may be in the form of an acoustic impedance transformer, made of a solid block of metal such as aluminum alloy or Monel, and a half wave length (or an integral number thereof) long at the frequency of vibration. The portion 71a thereof coupled to the connecting member 78 is of relatively greater mass than the other or free end 71b. The transition region between the two sections of differing mass is located at approximately the nodal or quarter wave point along its length. The difference in mass between the two halves of the member 71 effect an acoustic impedance transformation which increases the amplitude of vibration at the free end or working face 87 relative to the driven end in inverse ratio to their masses. A more complete discussion of the acoustic impedance transformer may be found in Patent No. Re. 25,033, granted Aug. 29, 1961, and assigned to the present assignee. For the purposes of the present invention, it is sufficient to note that the application of a relatively small longitudinal vibration to the input end of 71a of the member 71 will produce an amplified longitudinal vibration at its free end or working face 87 in the direction indicated by the arrows 88. Thus, the vibration induced in the magnetostrictive stack 72 is coupled through connecting body 78 and amplified in the vibrating element 71.

For monitoring purposes, a vibration responsive device 89 may be provided on the member 71 of any suitable type capable of generating an electrical signal proportional to its amplitude of vibration. This signal is fed back to the oscillation generator via leads 90 (FIG. 2) and will generally vary due to changes in temperature of the member 71, or changes in loading thereof. This signal is received by the generator 77 and in any conventional manner automatically adjusts either the frequency or amplitude of vibration of the ultrasonic vibrator 14.

As seen in FIGS. 11 and 12, the entire ultrasonic vibrator 14 can be supported by means of the support block 79 since substantially no vibratory energy is imparted to the support block by virtue of its coupling to the connecting body 78 at its nodal point, this mounting arrangement imparts no vibrational energy to the remainder of the equipment with which it is used. The ultrasonic vibrator 14 is supported by means of the bracket assembly 95 which is comprised of a pair of support units 96 having a dovetail connection with the mounting block 79 to permit relative longitudinal movement therebetween. The support units 96 are fixed as by bolts 97 to the vertical legs of angle brackets 98 and the horizontal legs 99 (FIG. 2) thereof are secured to the underside 30 of work top 25 as by bolts 100. The support block 79 is slidably adjusted with respect to the support units 96 by means of a micrometer handle 101, and whereby precise positioning of the working face 87 of the ultrasonic vibratory member with respect to the working surface 28 of the work top 25 may be effected.

To advance the overlapped sheet 16 and 20 past the joining station 11, that is between the working faces 61 and 87 of the vibratory members 47 and 71 respectively, feeding means 105 as illustrated in FIG. 3 is provided, so that the overlapped portions 17 and 21 in contact with each other are simultaneously subjected to the low sonic and ultrasonic vibratory forces along the desired area of overlap 22. The feeding means 105, operative to advance the overlapped sheets may be run continuously or intermittently in synchronism with the low sonically vibrated force applying member 47 so that the materials are substantially at rest when engaged by the working face thereof.

The feeding mechanism 105 consists of upper and lower rollers 106 and 107 respectively, that are rotatably mounted in parallel spaced relationship to each other to frictionally engage opposite sides of the sheets along their area of overlap 22. A U-shaped support 108 is secured by bolts 109 to the underside of the head portion 37 of the reciprocating mechanism 12 and the roller 106 is secured to shaft 110 which is rotatably mounted on the parallel spaced legs 111 of the U-shaped bracket 108. The shaft is rotated by a suitable motor 112, which may be wired to run continuously or in timed relationship to the movement of the pressure member 47 for feeding material in the direction of arrow 113. The lower roller 107 is secured to shaft 114 which is rotatably mounted between a pair of L-shaped brackets 115 situated within aperture 29 and secured by bolts 116 to the underside 30 of the work top 25.

Even when the materials are moved continuously past the members 71 and 47 without intermittent pauses the temperature of the ultrasonic member may be maintained within defined limits since the static force of the low frequency vibrator is only applied intermittently. With the present invention the very intermittence in the sealing cycle also permits a variety of seals to be obtained. Whether the seal is air tight or fluid tight depends on the rate of travel of the thermoplastic materials, the modulating low frequency and the gap width variation introduced. If desired the variables may be selected so that there is an overlap of successive seals wherein continuity may be thus achieved. Of course, there are many applications which do not require continuity of seals and in these cases, almost any sewing machine arrangement would be acceptable. Thus, by vibrating the pressure member 47 at a low sonic frequency, as the sheets of materials 16 and 20 move relative to the stationary ultrasonic vibrator 14 the possibility of the plastic sheets being subjected to the plowing action due to the frictional forces is substantially eliminated. In addition, the continuous contact of the ultrasonically vibrated member with the plastic sheets under a static pressure, as in prior art devices, which causes excessive heating thereof and resultant fluctuations in the quality of seals obtained is also eliminated.

Figure 4:
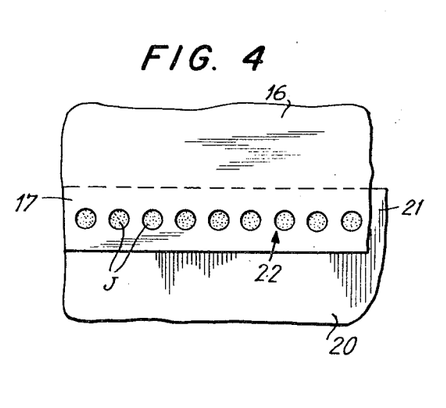
FIG. 4 is a partial view taken along line 4—4 of FIG. 1, and illustrating one of the joining patterns obtainable with the present invention.

As seen in FIG. 1 the force applying members 47 and 71 have, at least in part, confronting working faces 61 and 87 which apply the vibratory forces in a plane substantially perpendicular to the area of overlap 22 as indicated by arrows 58 and 88. By having a continuously varying spacing or gap that oscillates from a minimum as illustrated in FIGS. 1 and 2, during which time the sheets are compressed, to a maximum, during which time the sheets are moved relative to the force applying members, the variation of thickness that is generally present in sheet materials is no longer critical. As seen in FIG. 4 a series of spaced joinings J along the area of overlap 22 is obtained as the sheets 16 and 20 are moved relative to joining station 11. The pressure member 47 compresses the materials sufficiently to generally leave an indentation which coincides with the configuration of the working face 61 of the pressure member. The depth of the indentation will vary with the composition, thickness of the sheets, as well as the rate of advancement of the materials.

Figure 6:
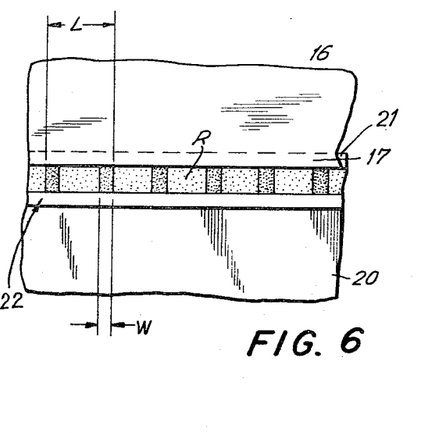
FIG. 6 is a view taken along line 6—6 of FIG. 5, illustrating the joined configuration of the sheets of material.
Figure 7:
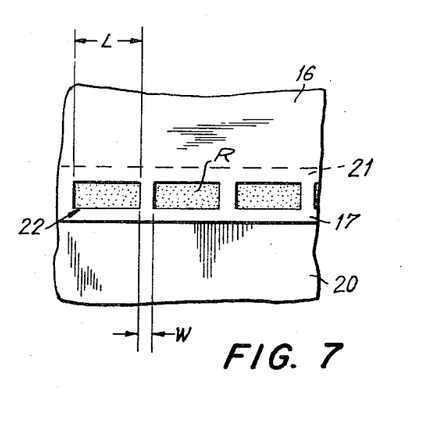
FIGS. 7 and 8 are views similar to those of FIG. 6 illustrating various modified forms of the joining pattern.
Figures 8, 10:
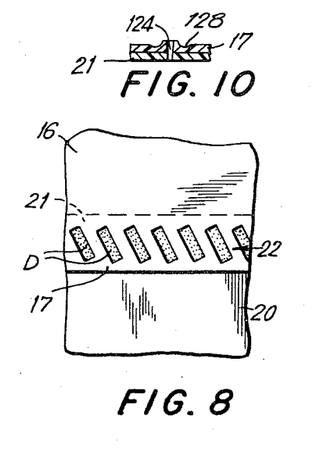
FIG. 10 is a cross-sectional view of the joint obtained with the apparatus of FIG. 9.

FIGS. 6, 7 and 8 illustrate similar results which may be obtained with other patterns and utilized to obtain a series of interrupted or uninterrupted joinings. Of course, for interrupted joinings the interval between joinings can be varied as can their location so long as the feeding means 105 is synchronized with the motion of the reciprocating mechanism 12. Any one of several different geometric figures are obtainable with the present invention. Thus rectangles, circles, squares, diamonds, diagonal lines and the like may be used.

Figure 5:
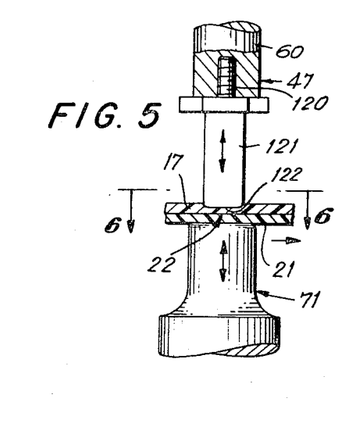
FIG. 5 is an enlarged fragmentary elevational view, partly in axial section, illustrating a modified arrangement for transmitting the vibratory forces to the materials being joined.

As shown in FIG. 5, to permit quick change from one design to another the lower portion 60 of the pressure member 47 may be modified to accept the threaded portion 120 of the adapter 121 which has, for example, a rectangular working face 122 to engage and compress the overlapped portions 17 and 21 of the sheets in their area of overlap 22. Simultaneously, therewith ultrasonic vibratory forces transmitted by member 71 are applied in a plane substantially perpendicular to the area of overlap to there join the sheets by the combined low sonic and ultrasonic vibratory energy. FIG. 6 illustrates how the geometric figure consisting of rectangles of a length L can be partially superimposed upon each other by a given width W to obtain an uninterrupted series of joinings R.

FIG. 7 illustrates the use of the same adapter 121 for joining materials in which the rate of advancement of the sheets 16 and 20 is synchronized with the low sonically vibrated member so that the sheets are not only substantially at rest when engaged by the working face 61 thereof but have advanced sufficiently between each successive engagement so that a series of interrupted joinings R are obtained. The length of each spaced joining being L and the distance between each successive joining being equal to a distance W.

FIG. 8 illustrates how the geometric figures may consist of diagonals D along the area of overlap 22 of the sheets 16 and 20. In the form of geometric figures illustrated in FIGS. 4, 7 and 8, it will be noted that spaces or intervals which lie between the geometric figures and which define the interruption of same actually are unsealed portions. This type of structure may be preferable with certain packaging of materials or for easy open seals.

Figure 9:
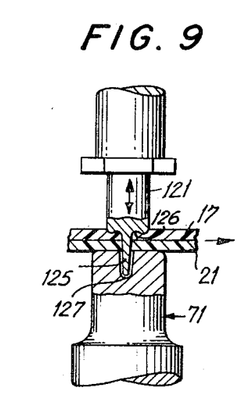
FIG. 9 is an enlarged fragmentary elevational view, partly in axial section, illustrating a modified arrangement in which one of the sheets is joined having a surface projection for increasing the strength of the joint.

As shown in FIGS. 9 and 10 the apparatus of the present invention may be adapted to simultaneously form, pierce and join the sheets of material. The adapter 121 is provided with a tapering tooth 125 which extends from adapter 121 and merges with an annular recess 126 which is provided to accept any overflow of the overlapping sheets 17 and 21 when joined. The ultrasonically vibrated member 71 is provided with an accommodating opening 127 to receive the tooth 125 when the two members are in the position shown in FIG. 9. The completed contoured joint as seen in FIG. 10 will have a deformed annular area 128 which corresponds to the annular depression 126 and an aperture 124 formed by the tooth 125. A joining of this type may generally be used in fabricating of materials wherein exceptional strength is required or a non air tight package is being created.

Figure 13:
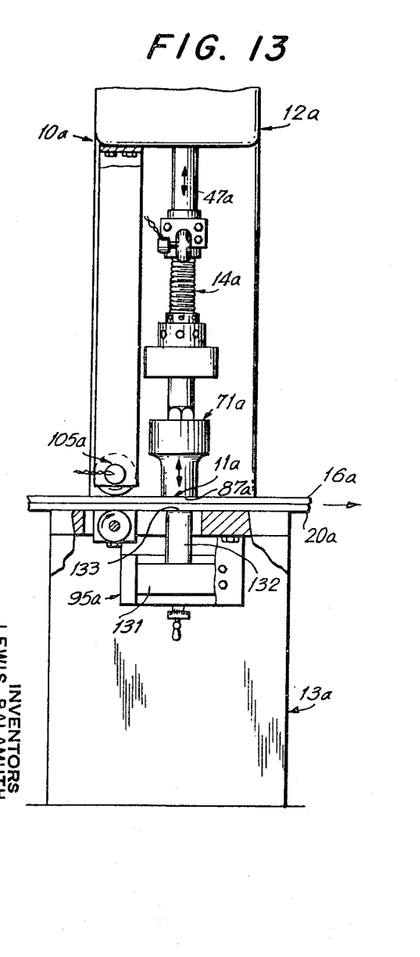
FIGS. 13 and 14 are views similar to those of FIGS. 1 and 2, respectively, but illustrating another embodiment of the invention, wherein the vibratory forces in the low sonic an dultrasonic frequencies are applied at one side of the materials.
Figure 14:
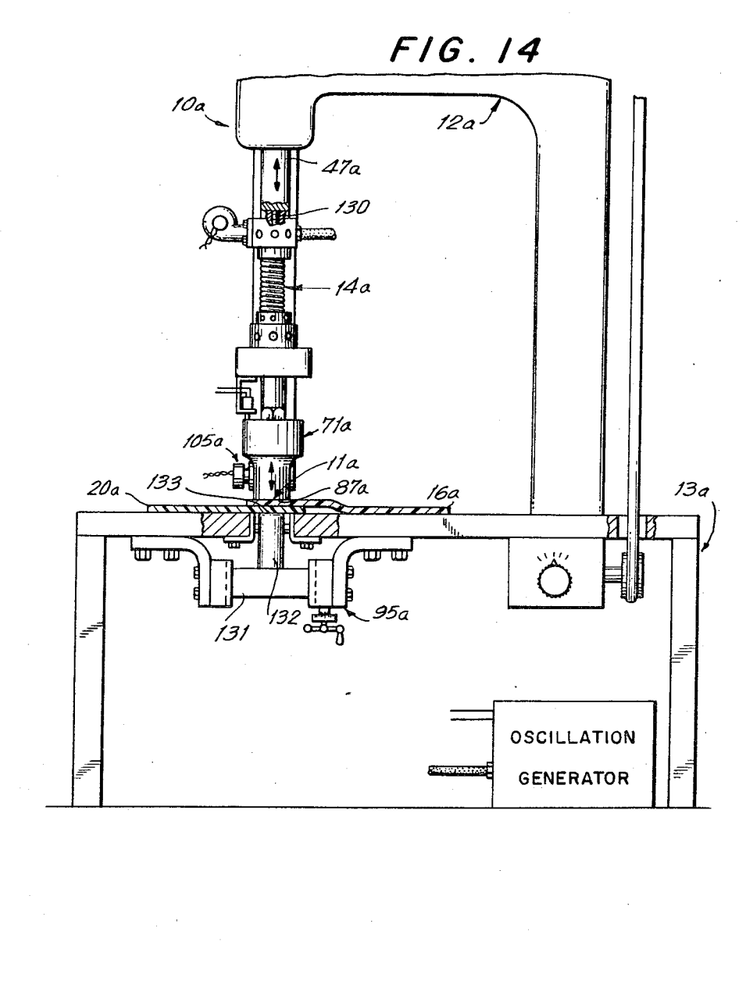

In the above described apparatus 10, the reciprocating mechanism 12 and the ultrasonic vibrator 14 are mounted to apply the low sonic and ultrasonic vibratory forces at opposite sides of the overlapped sheets. However, as shown in FIGS. 13 and 14, the vibratory joining apparatus 10a which is generally similar to the apparatus 10 and has its parts identified by the same reference numerals employed in connection with the corresponding parts of apparatus 10, but with the latter "a" appended thereto, is designed to apply the low sonic and ultrasonic forces at one side of the overlapped sheets, along a common line, as said sheets are supported at their opposite side. By reason of applying the two vibratory forces, which are superimposed upon each other, the working face 87a of the ultrasonic vibrator 14a applies the pressural contact required between the overlapped surfaces and also transmits the ultrasonic energy as well.

As seen in FIG. 14 the reciprocating mechanism 12a is mounted on the support structure 13a and the pressure member 47a is longitudinally vibrated in the low sonic frequency range as previously described with respect to FIGS. 1 and 2. The ultrasonic vibrator 14a is secured as by a threaded stud 130 extending from pressure member 47a into the rear portion of the ultrasonic vibrator 14a to rigidly join the two vibrators together. In this arrangement the working face 87a of the ultrasonic vibrator 14a will vibrate at two separate frequencies, and impart vibratory forces including a component in the ultrasonic range and a component in the low sonic frequency range to the overlapped sheets of material 16a and 20a. At the opposite side of the sheets 16a and 20a support block 131 is mounted within bracket assembly 95a and is provided with a support arm 132 having a working face 133 to support and apply a static component to the overlapped sheets as the latter are compressed and joined by the vibratory forces applied thereto.

By oscillating the ultrasonic vibrator 14a at the low sonic frequency we insure complete separation between the overlapped sheets and working face 87a for each sequential joining. This separation during a portion of each joining cycle permits a further reduction in the heating of the vibratory tool 71a. As the sheets are passed through the joining station 11a repetitive forces are applied in a similar manner as in a conventional sewing machine except that the joinder of the sheets is accomplished purely by applying vibratory forces.

Although the low sonic and ultrasonic forces are generated by two vibrators 12a and 14a respectively, it can be appreciated by those skilled in the art that a vibrator 14a may be designed to vibrate at two frequencies, consisting of vibrations in the low sonic and ultrasonic range, by varying or supplying the alternating current to the coil windings of the transducer at two different frequencies.

For various combinations of materials that vary in thickness or composition it is not always possible to join said materials with the application of the ultrasonic forces applied at one side thereof only. Thus, to join two different plastics of substantially different melting points it is desirable that ultrasonic vibratory forces are applied to each of the sheets by employing two ultrasonic vibrators vibrated at either different frequencies or power input, gauged to produce surface melting of both of the variable melting point plastic sheets. Additionally, the contact pressure of each ultrasonic vibrator may also be varied. In other words, by a suitable variation in the imposed frequencies, power input or pressures, the overlapping surfaces of two different melting point plastics can be simultaneously joined together.

Figure 15:
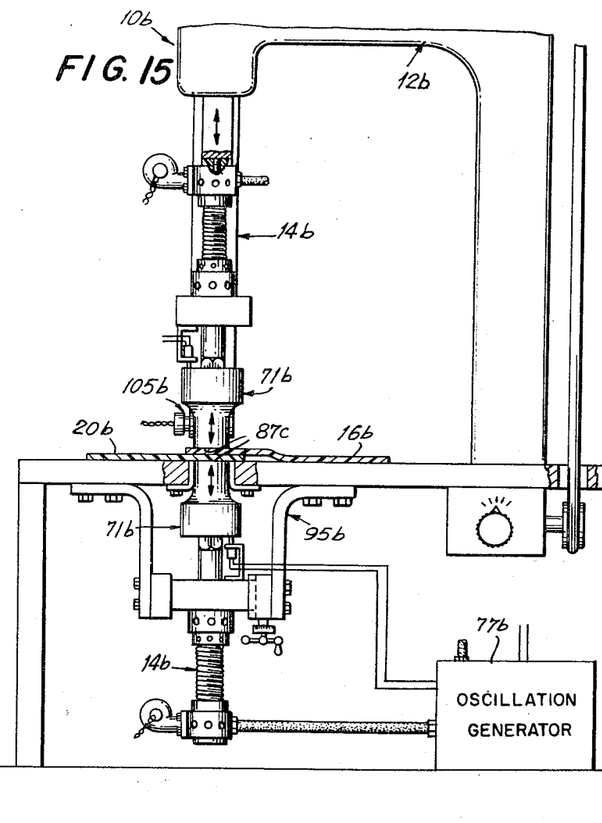
FIG. 15 is a view similar to that of FIG. 2, but illustrating another embodiment of the invention; wherein vibratory forces in the ultrasonic range are applied to one side of the materials and combined sonic and ultrasonic forces applied to the other side.

In each previously described vibratory joining apparatus 10 or 10a, the vibratory forces applied were applied along a common line with only one component thereof in the low sonic and ultrasonic frequency range. However, as shown in FIG. 15, vibratory joining apparatus 10b, which is generally similar to the previously described apparatus 10, and which has its several parts identified by the same reference numerals as have been used in describing the corresponding parts on the apparatus 10, is provided with means to simultaneously apply ultrasonic vibratory forces to both sides of the sheets 16b and 20b. The lower ultrasonic vibrator 14b is mounted by bracket assembly 95b to the supporting structure 13b and is vibrated in the ultrasonic frequency range while the upper ultrasonic vibrator 14b is mounted to the reciprocating mechanism 12b and longitudinally driven thereby. Oscillation generator 77b may be wired to both ultrasonic vibrators 14b or separate generators operating at different frequencies may be employed.

The feeding means 105b advances the overlapped materials between the confronting working faces 87b of the ultrasonic vibrators 14b so that the overlapped surfaces are subjected to vibratory forces on both sides when compressed by the upper ultrasonic vibrator 14b which is also vibrated in the low sonic range to cause a true physical separation between the sheets and the upper vibrator 14b during each vibration cycle. In this manner it is possible to transmit the requisite vibratory forces to the overlapped surfaces and still retain the enhanced cooling effect of the present invention since there is generally no relative movement between the force applying members 71b and the sheets 16b and 20b when the latter are under compression.

Figure 16:
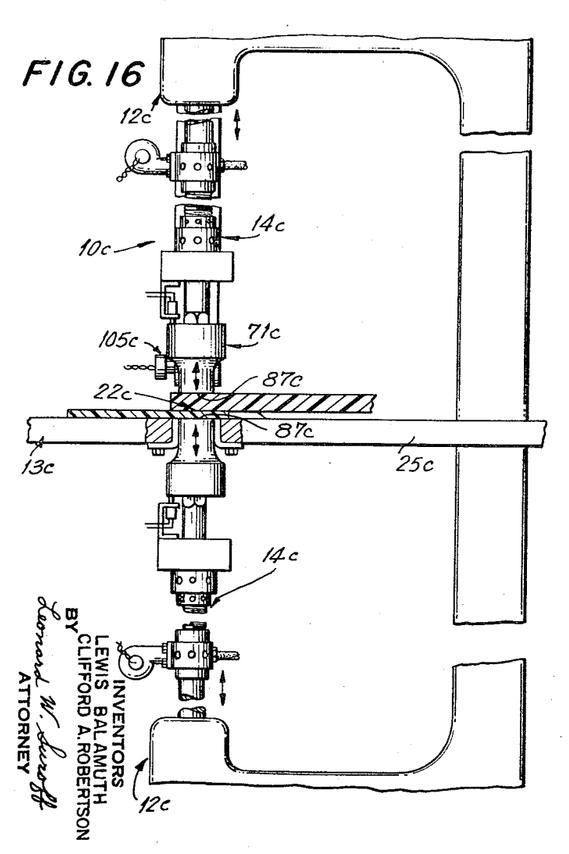
FIG. 16 is a view similar to that of FIG. 2, but illustrating another embodiment of the invention, wherein low sonic and ultrasonic forces are simultaneously applied to both sides of the materials.

For other joining applications it is desirable to not only apply the ultrasonic forces to both sides of the materials being joined but the low sonic vibratory forces as well. As illustrated in FIG. 16 the vibratory apparatus 10c includes a pair of reciprocating mechanisms 12c mounted on opposite sides of the work top 25c of the supporting structure 13. Vibrators 14c are each secured to a respective mechanism 12c so that their confronting working faces 87c engage opposing sides of the overlapped sheets 16c and 20c. The reciprocating mechanisms 12c are generally vibrated at the same frequency and in phase relationship to each other but the ultrasonic vibrators 14c may vary depending on the properties of the materials being joined. As seen one of the layers to be joined such as 16c may be relatively thick in the plane perpendicular to its overlapping surface whereas the other layer 20b is relatively thin.

The materials are fed between the vibratory members by feeding means 105c and simultaneously subjected to the low sonic and ultrasonic vibratory forces, which are applied along a common line in the desired area of overlap 22c to join the materials together by the combined low sonic and ultrasonic forces.

Although the vibratory forces have been illustrated as being applied along a common line and at one location, it will be apparent that the described vibratory apparatus can be constructed so that a plurality of vibrators are mounted in series and in alignment with the area of overlap to simultaneously join the sheets along extended lengths of overlap to thereby increase the rate of advancement of the overlapped sheets relative to the vibrators.

From the above, it will be apparent that the joining apparatus embodying this invention employs combined forces in the low sonic and ultrasonic frequency range that are introduced in the area of overlap to effect a joinder of the materials by utilizing the low sonic vibrations to compress the materials and permit the proper coupling of the ultrasonic vibrations thereto. Since the low sonic vibratory mechanism causes a separation, the static clamping pressure is present only when the materials are joined and at other times they are free to move relative to the force applying members so as not to induce heating in the ultrasonic vibrator. Additionally, by varying the rate of oscillation of the low sonic vibrator joinings may be obtained of a variety of patterns that are either continuous or intermittent.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention, except as defined in the appended claims.

We claim:

1. A method of joining normally solid materials, at least one of which is thermosoftening, comprising the steps of
    (A) positioning said materials in contact with each other to form an area of overlap,
    (B) applying an ultrasonic vibratory force
    (C) applying a low sonic frequency force to couple the ultrasonic vibratory force to the materials during a portion of the low frequency cycle to effect a joining of the materials, and
    (D) moving said materials relative to the forces so as to progressively join the materials along their area of overlap 2. A method as in claim 1, wherein said vibratory forces are applied along a common line and in a plane substantially normal to the overlapping surfaces of said materials.

3. A method of joining normally solid materials, at least one of which is thermosoftening, comprising the steps of
    (A) positioning said materials in contact with each other to form an area of overlap,
    (B) applying vibratory forces through said materials in their area of overlap, said forces including a component in the ultrasonic frequency range and a component in the low sonic frequency range, said component forces being applied to said materials along a common line and in a plane substantially normal to the overlapping surfaces of said materials, and
    (C) moving said materials and common line relative to each other on an intermittent basis so as to progressively join the materials along their area of overlap, said intermittent movement being synchronized with the low sonic frequency forces such that no relative motion occurs when said low sonic forces are applied.

4. A method as in claim 3; wherein the relative movement of the overlapped materials and the low sonic frequency forces is regulated to form a continuous joining therebetween.

5. A method as in claim 3; wherein the relative movement of the overlapped materials and the low sonic frequency forces is regulated to form a series of spaced joinings therebetween.

6. A method of joining sheets of material, at least one of which is thermoplastic, comprising the steps of
   (A) positioning at least a portion of said sheets in contact with each other to form an area of overlap,
   (B) applying vibratory forces to both sides of the sheets in their area of overlap, said forces including a component in the ultrasonic frequency range, applied substantially normal to the overlapped surfaces and at one side thereof, and a component in the low sonic frequency range applied to the sheets at the other side thereof, said component forces being applied to said sheets along a common line, and
   (C) moving said sheets and said common line relative to one another so as to progressively join the sheets along their area of overlap by the combined low sonic and ultrasonic forces.

7. A method of joining sheets of material, at least one of which is thermoplastic, employing opposed vibratory members having working faces for engagement with the sheets of material, comprising the steps of
   (A) overlapping the sheets of material at least in the region where they are to be joined,
   (B) advancing the overlapped sheets between said working faces,
   (C) vibrating one of said members in the ultrasonic frequency range to engage its working face with the overlapped sheets at one side thereof to impart high frequency vibratory forces thereto, said force being applied in a plane substantially normal to the overlapped surfaces, and
   (D) simultaneously vibrating the other member in the low sonic frequency range to engage its working face with the other side of the overlapped sheets to impart low frequency vibratory forces thereto, said low frequency forces compressing together the sheets of material to effect transmission of said ultrasonic vibrations through the overlapped sheets with a resulting joining therebetween.

8. A method of joining sheets of material, at least one of which is thermoplastic, comprising the steps of
   (A) positioning said sheets in contact with each other to form an area of overlap,
   (B) applying an ultrasonic vibratory force
   (C) applying a low sonic frequency force on the opposite side of the materials, to couple the ultrasonic vibratory force to the materials during a portion of the low frequency cycle to effect a joining of the sheets of materials, and
   (D) moving said sheets and forces relative to one another so as to progressively join the sheets along their area of overlap.

9. A method of joining sheets of material, at least one of which is thermoplastic, employing a first and second member having working faces for engagement with opposite sides of the sheets of material, comprising the steps of
   (A) overlapping the sheets of material at least in the region where they are to be joined,
   (B) advancing the overlapped sheets between said working faces,
   (C) maintaining the working face of one of said members in continuous engagement with one side of the overlapped sheets for support thereto, and
   (D) vibrating the other member in the low sonic and ultrasonic frequency range to engage its working face with the other side of the overlapped sheets during a portion of the low frequency cycle, said forces being sufficient to compress together and effect transmission of said ultrasonic vibrations through the overlapped sheets with a resulting joining therebetween.

10. A method of joining sheets of materials, at least one of which is thermoplastic, comprising the steps of
    (A) overlapping at least a portion of said sheets in contact with each other,
    (B) applying an ultrasonic vibratory force on both sides of the sheets,
    (C) applying a low sonic frequency force to couple the ultrasonic vibratory forces to both sides of the sheets during a portion of the low frequency cycle to effect a joining of the materials, and
    (D) moving said sheets relative to the forces so as to progressively join the sheets along their area of overlap.

11. A method of joining sheets of material, at least one of which is thermoplastic, employing a first and second vibratory member having working faces for engagement with opposite sides of the sheets of material, comprising the steps of
    (A) overlapping the sheets of material at least in the region where they are joined,
    (B) advancing the overlapped sheets between said working faces,
    (C) applying an ultrasonic vibratory force to the working face of the first vibratory member for engagement with one side of the overlapped sheets,
    (D) applying an ultrasonic vibratory force to the working face of the second vibratory member, and
    (E) applying a low sonic frequency force to the working face of the second vibratory member to couple the ultrasonic vibratory forces to opposite sides of the overlapped sheets during a portion of the low frequency cycle to effect a joining of the sheets of material.

12. A method of joining sheets of material, at least one of which is thermoplastic, comprising the steps of
    (A) positioning at least a portion of said sheets in contact with each other to form an area of overlap,
    (B) applying a first ultrasonic vibratory force to one side of the overlapped sheets,
    (C) applying a first low sonic frequency force to couple the first ultrasonic vibratory force to the sheets during a portion of the low frequency cycle,
    (D) applying a second ultrasonic vibratory force to the overlapped sheets on the side opposite the first vibratory force,
    (E) applying a second low sonic frequency force to couple the second ultrasonic vibratory force to the sheets during a portion of the low frequency cycle whereby the coupling by the first and second low sonic frequency forces effects a joining of the materials, and
    (F) moving said materials relative to the forces so as to progressively join the materials along their area of overlap by the combined low sonic and ultrasonic forces.

13. A method as in claim 12; wherein the ultrasonic forces are applied to both sides of the sheets at substantially the same frequency in the range of 10,000 to 100,000 cycles per second, and the low sonic forces are applied to both sides of the sheets at substantially the same frequency in the range of from 0 to 1000 cycles per second.

14. A method as in claim 12; wherein the ultrasonic forces are applied to both sides of the sheets at substantially different frequencies in the range of 10,000 to 100,000 cycles per second, and the low sonic forces are applied to both sides of the materials at substantially the same frequency in the range of from 0 to 1000 cycles per second.

15. A method of joining sheets of material, at least one of which is thermoplastic, employing opposed vibratory members having working faces for engagement with the sheets of material, comprising the steps of
  (A) overlapping the sheets of material at least in the region where they are to be joined,
  (B) advancing the overlapped sheets between said working faces, and
  (C) simultaneously vibrating the opposed members in the low sonic and ultrasonic frequency range to engage their working face with the opposite sides of the overlapped sheets to impart vibratory forces thereto, said forces being sufficient to compress together and effect transmission of said ultrasonic vibrations through the overlapped sheets with a resulting joining therebetween.

16. Apparatus for joining overlapped normally solid materials at least one of which is thermosoftening, comprising
  (A) means for positioning said materials in contact with each other to form an area of overlap,
  (B) means for applying an ultrasonic vibratory force
  (C) means for applying a low sonic frequency vibratory force,
  (D) means for coupling the low sonic frequency force to the ultrasonic frequency force during a portion of the low frequency cycle to effect a joining of the materials, and
  (E) means for moving said materials relative to the force so as to progressively join the materials along their area of overlap by the combined low sonic and ultrasonic forces.

17. Apparatus for joining overlapped, normally solid materials, at least one of which is thermosoftening, comprising
  (A) means for positioning said materials in contact with each other to form an area of overlap,
  (B) means for applying vibratory forces through said materials in their area of overlap, said forces including a component in the ultrasonic frequency range and a component in the low sonic frequency range, said component forces being applied to said materials along a common line and in a plane substantially normal to the overlapping surfaces of said materials, and
  (C) means for moving said materials and common line relative to each other on an intermittent basis so as to progressively join the materials along their area of overlap, said intermittent movement being synchronized with the low sonic frequency forces such that no relative motion occurs when said low sonic forces are applied.

18. Apparatus for joining together overlapped normally solid materials, at least one of which is thermosoftening, comprising
  (A) force applying members having, at least in part, confronting working faces for engagement with opposite sides of the overlapped materials,
  (B) means for vibrating the working face of at least one of said members to simultaneously apply vibratory forces in the low sonic and ultrasonic frequency range through said materials in their area of overlap, said forces being applied in a plane substantially normal to the overlapped surfaces, and
  (C) feeding means operative to advance the overlapped materials between said working faces of the members so that the overlapped materials are simultaneously subjected to the low sonic and ultrasonic vibratory energy and joined together along the desired area of overlap.

19. Apparatus as in claim 18; wherein said working faces are contoured to simultaneously form and join the materials.

20. Apparatus as in claim 18; wherein said working faces are contoured to simultaneously pierce and join the materials.

21. Apparatus for joining together overlapped normally solid materials, at least one of which is thermosoftening, comprising
  (A) force applying members having, at least in part, confronting working faces for engagement with opposite sides of the overlapped materials,
  (B) means for vibrating the working face of at least one of said members to simultaneously apply vibratory forces in the low sonic and ultrasonic frequency range through said materials in their area of overlap, said forces being applied in a plane substantially normal to the overlapped surfaces, and
  (C) feeding means operative to advance the overlapped materials between said working faces of the members so that the overlapped materials are simultaneously subjected to the low sonic and ultrasonic vibratory energy and joined together along the desired area of overlap, said feeding means being synchronized with the low sonically vibrated member so that the materials are substantially at rest when engaged by the working face thereof.

22. Apparatus for joining together overlapped sheets of material, at least one of which is thermoplastic, comprising
  (A) means for supporting the sheets of material in their overlapped relationship,
  (B) means for supporting a pair of members in spaced relationship to each other, said members having confronting working surfaces for engagement with opposite sides of the overlapped sheets of material,
  (C) feeding means operative to advance the overlapped sheets along said supporting means and between the working faces of said members, and
  (D) means for simultaneously applying vibratory forces in the low sonic and ultrasonic frequency range through said materials in their area of overlap, said vibratory forces being applied by vibrating at least one of the working faces of said members in a plane substantially normal to the overlapped surfaces to progressively form a series of joinings between said materials.

23. Apparatus for joining overlapped sheets of material, at least one of which is thermoplastic, comprising
  (A) vibratory members having, at least in part, confronting working faces for engagement with opposite sides of the overlapped sheets,
  (B) means for vibrating the working face of one of said members in the ultrasonic frequency range and in a plane substantially normal to the overlapped surfaces,
  (C) means for simultaneously vibrating the working face of the other of said members in the low sonic frequency range, and
  (D) feeding means operative to advance the overlapped sheets between said working faces of the vibratory members so that the overlapped sheets are simultaneously subjected to the low sonic and ultrasonic vibratory energy and joined together along their area of overlap.

24. Apparatus for joining overlapped sheets of material, at least one of which is thermoplastic, comprising
  (A) a vibrator being provided with a working face,
  (B) mounting means supporting said vibrator,
  (C) means for energizing said vibrator to thereby cause said working face to longitudinally vibrate in the ultrasonic frequency range,
  (D) a vibratory pressure member mounted in opposed relationship to said vibrator and being provided with a working face, which in part, confronts the working face of said vibrator,
  (E) means for vibrating the pressure member in the low sonic frequency range and in a direction substantially perpendicular to the working face of the ultrasonic vibrator to exert a clamping pressure on the overlapped sheets engaged between said faces of the vibrator and pressure member, and
(F) feeding means operative to advance the overlapped sheets between said working faces of the vibrator and pressure member so that the overlapped sheets are successively subjected to the clamping pressure and joined along the desired area of overlap.

25. Apparatus for joining together overlapped sheets of material, at least one of which is thermoplastic, comprising
(A) force applying members having, at least in part, confronting working faces for engagement with opposite sides of the overlapped sheets of material,
(B) means for maintaining the working face of one of said members in continuous engagement with one side of the overlapped sheets,
(C) means for simultaneously vibrating the working face of the other member at frequencies in the low sonic and ultrasonic range, and
(D) feeding means operative to advance the overlapped materials between said working faces of the vibratory members so that the overlapped sheets are simultaneously subjected to the low sonic and ultrasonic vibratory energy and joined together along the desired area of overlap.

26. Apparatus for joining together overlapped sheets of material, at least one of which is thermoplastic, comprising
(A) vibratory members having, at least in part, confronting working faces for engagement with opposite sides of the overlapped sheets,
(B) means for simultaneously vibrating the working face of one of said members at frequencies in the low sonic and ultrasonic range,
(C) means for simultaneously vibrating the working face of the other of said members in the low sonic frequency range, and
(D) feeding means operative to advance the overlapped materials between said working faces of the vibratory members so that the overlapped materials are simultaneously subjected to the low sonic and ultrasonic vibratory energy and joined together along the desired area of overlap.

27. Apparatus for joining overlapped sheets of material, at least one of which is thermoplastic, comprising
(A) vibratory members having, at least in part, confronting working faces for engagement with opposite sides of the overlapped sheets,
(B) means for simultaneously vibrating the working faces of each of said members at frequencies in the low sonic and ultrasonic range, and
(C) feeding means operative to advance the overlapped sheets between said working faces of the vibratory members so that the overlapped materials are simultaneously subjected to the low sonic and ultrasonic vibratory energy and joined together along the desired area of overlap.

References Cited

UNITED STATES PATENTS

| | | | |
|---|---|---|---|
| 2,946,120 | 7/1960 | Jones et al. | 29—470 |
| 3,022,814 | 2/1962 | Bodine | 156—73 |
| 3,146,141 | 8/1964 | Woodland | 156—73 |
| 3,308,003 | 3/1967 | Deans | 156—580 |
| 3,294,616 | 12/1966 | Linsley et al. | 156—580 |

EARL M. BERGERT, *Primary Examiner.*

D. J. FRITSCH, *Assistant Examiner.*

U.S. Cl. X.R.

156—580